United States Patent

Hagopian

[15] 3,660,617

[45] May 2, 1972

[54] LOW PROFILE SINGLE-TURN MAGNETIC RECORDING HEAD WITH READ/WRITE WINDING COUPLED TO SINGLE TURN WINDING

[72] Inventor: Jacob John Hagopian, San Jose, Calif.

[73] Assignee: International Business Machines Corporation, Armonk, N.Y.

[22] Filed: Dec. 29, 1969

[21] Appl. No.: 888,632

[52] U.S. Cl. ..................................179/100.2 C, 340/174.1 F

[51] Int. Cl. ..........................................................G11b 5/20

[58] Field of Search ......................179/100.2 C; 340/174.1 F; 346/74 MC

[56] References Cited

UNITED STATES PATENTS

| | | | |
|---|---|---|---|
| 3,535,466 | 10/1970 | Foster | 179/100.2 C |
| 2,615,097 | 10/1952 | Camras | 179/100.2 C |
| 3,008,793 | 11/1961 | Shifrin | 346/74 MC |
| 2,905,770 | 9/1959 | Kornei | 179/100.2 C |

*Primary Examiner*—Bernard Konick
*Assistant Examiner*—Alfred H. Eddleman
*Attorney*—Hanifin and Jancin and Shelley M. Beckstrand

[57] ABSTRACT

A low profile, single-turn magnetic head with integral transformer coupling between a read/write winding and the single-turn winding. The flux from the transformer action is at right angles to the flux in the magnetic path for the single turn.

9 Claims, 2 Drawing Figures

PATENTED MAY 2 1972 3,660,617

*INVENTOR.*
JACOB J. HAGOPIAN

BY Shelley M. Beckstrand
ATTORNEY

LOW PROFILE SINGLE-TURN MAGNETIC RECORDING HEAD WITH READ/WRITE WINDING COUPLED TO SINGLE TURN WINDING

BACKGROUND OF THE INVENTION

1. Field of the Invention

The present invention is directed to an apparatus for producing and reproducing magnetic data records and more specifically, a single-turn magnetic transducer with integral transformer coupling to a read/write coil.

2. Prior Art

Known to the prior art are single-turn heads in which either a single conductor passes through an aperture above the gap, or the read/write gap is formed by a thin-film electrical conductor. Also known in the prior art are single-turn heads with transformer coupling to read/write windings. However, in those prior art heads which have disclosed integral transformers there has been a characteristic deficiency in that undesirable spreading of writing field at the gap occurred due to reaction of the induced single-turn flux on the transformer flux.

In a disk type memory where a number of flat, circular recording disks are mounted in parallel relationship, the spacing between disks is largely determined by the height of the magnetic head. One approach to reducing head height in the prior art has been to form a transducer of a ring structure formed from a plurality of narrow concentric strips arranged in overlapping relation, the plane of the ring structure being parallel to the disk surfaces, and the recording gap being formed below (or above) the plane of the ring structure between the distal ends of tabs which extend laterally from the strips. This structure presents severe problems in controlling flux paths in the region of the gap making gap height very critical, and is not adaptable to a single-turn gap utilizing thin-film deposition technologies to prepare very narrow precise gap lengths.

It is therefore, an object of the invention to provide a thin-film head which provides improved recording densities, with no transformer flux spreading out from the pole tips due to the excitation of the primary winding.

It is a further object of the invention to provide a thin-film transducer where a conductive thin film is used to define the gap length and gap width, and to carry the transducing current.

It is a further object of the invention to provide a magnetic recording head including a transformer where transformer flux never leaves the core.

It is a further object of the invention to provide a head with improved reading and writing resolution during playback or recording of magnetic data on a magnetic medium.

It is a further object of the invention to provide a magnetic recording head of simple construction adaptable to mass production thin-film techniques and adaptable to construction of assemblies of a plurality of closely spaced heads for recording on or reading from a plurality of data tracks on a magnetic medium where write flux from each primary winding never encounters an air gap.

It is a further object of the invention to provide a head design which incorporates relatively non-critical gap height dimensions, making for a simple and economical assembly operation.

It is a further object of the invention to provide a single-turn head having a very small vertical dimension to permit a smaller space requirement between adjacent disks in a disk pack assembly or to reduce the overall thickness of a single-disk sealed cartridge.

SUMMARY OF THE INVENTION

A magnetic head constructed in accordance with one aspect of the invention comprises a magnetic core having wound thereon a primary winding and a secondary winding. The secondary winding includes a single-turn portion comprising the read/write gap of the head. The secondary winding is transformer coupled to the read/write (primary) winding, with flux in the transformer at right angles to flux in the magnetic circuit of the gap. According to a further aspect of the invention, the plane of the transformer core is essentially parallel to the plane of the magnetic recording medium.

The foregoing and other objects, features and advantages of the invention will be apparent from the following more particular description of preferred embodiments of the invention, as illustrated in the accompanying drawings.

DETAILED DESCRIPTION OF THE INVENTION

Figures 1, 2:
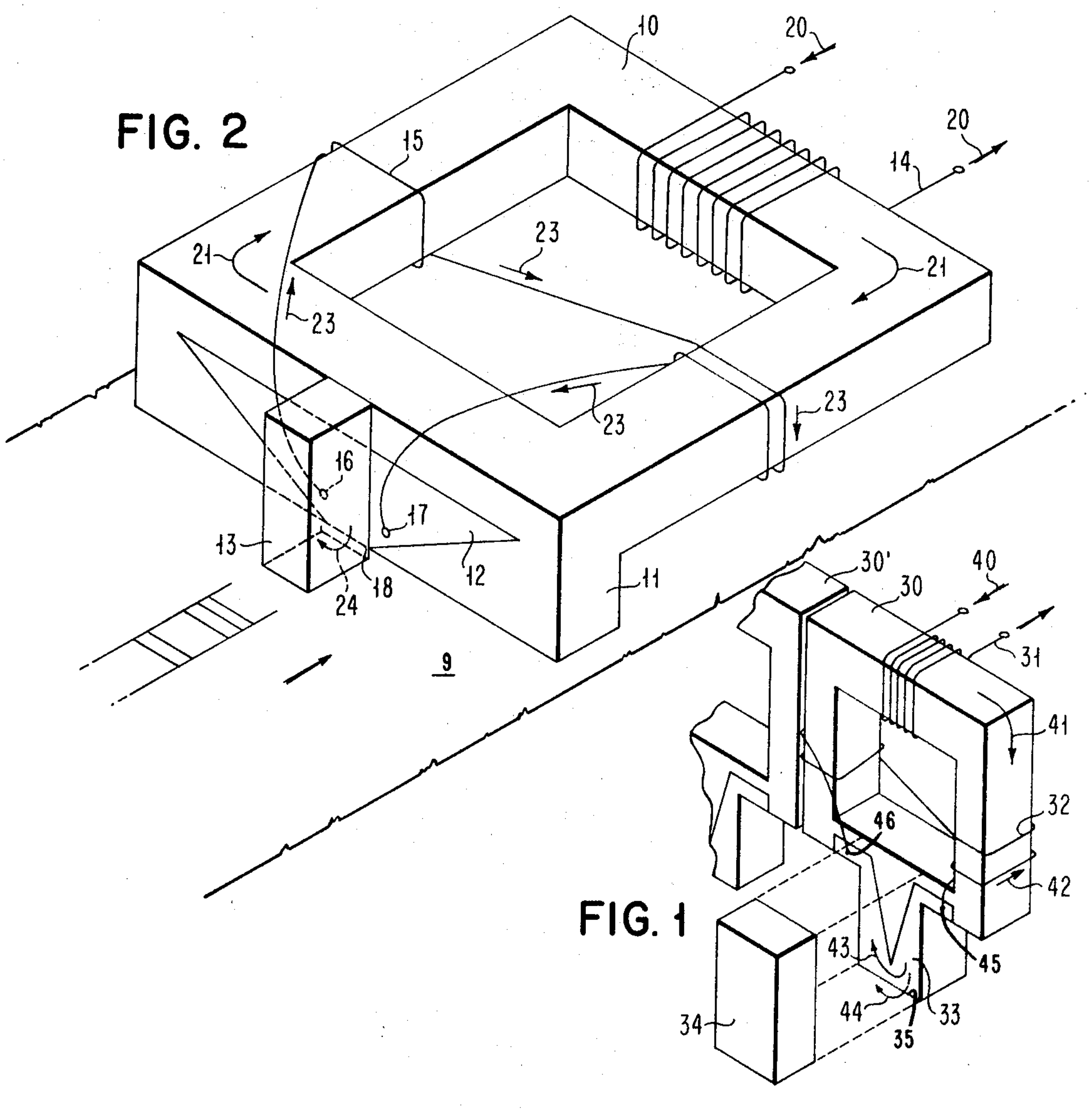
FIG. 1 is a view in perspective of a single-turn magnetic recording head constructed in accordance with the invention.
FIG. 2 is a view in perspective of a single-turn magnetic recording head constructed in accordance with a further aspect of the invention, incorporating parallel core and recording medium planes.

The magnetic transducing head of the invention presents means for recording and reproducing magnetic data in a magnetic medium.

Referring to FIG. 1, a magnetic transducing head constructed in accordance with the invention will next be described. Transformer core 30 comprises a ferrite block with a center hole. Obviously, the shape of the core 30 may be a solid rectangular as shown in FIG. 1 or many other similar shapes, such as that of a toroid. Wound upon core 30 is primary winding 31 and a secondary winding 32. These windings may be discrete wires as shown, or may be deposited on the surface of core 30 as lines of conductive materials. Secondary winding 32 includes within its electrical path a single-turn portion 33, said portion 33 being shown as a thin-film deposition of magnetic material having a configuration forcing the current to pass near the gap surface 35 above the magnetic medium. As shown, wire 32 is attached at points 45 and 46 to the single-turn portion 33.

The single-turn portion 33 is sandwiched between ferrite blocks 30 and 34 to form a gap having a length approximately equal to the thickness of the deposited layer 33, the width of the recording track being determined by the width of the lower portion 35 of layer 33.

In operation, as write current flows in primary winding 31 in the direction of arrow 40, magnetic flux is induced in core 30 in the direction of arrow 41. This flux induces a bucking current in secondary coil 32 in the direction of arrow 42. Said bucking current passes through the single-turn 33 between points 45 and 46 in the direction of arrow 43, inducing a magnetic flux 44 across the read/write gap between core 30 and pole piece 34.

It is a significant aspect of the present invention that the flux 44 is in a plane which is at right angle to the flux 41. The flux induced by primary winding 31 never leaves the ferrite block 30 (that is, does not encounter a nonmagnetic gap), nor does it induce a flux in the region of the transducing gap which interferes with the transducing flux 44.

As will be seen from FIG. 1, a plurality of transducing heads 30, 30' may be manufactured and assembled in an integrated assembly for cooperation with parallel data tracks on a recording medium.

Referring now to FIG. 2, a magnetic transducing head of the invention will be described including the aspect of parallel core and magnetic medium planes.

Transformer core 10 comprises a ferrite block with a center hole. Obviously, the shape of core 10 may take various shapes, such as the solid rectangle shown in FIG. 2. Wound upon core 10 are primary winding 14 and secondary winding 15.

In the present embodiment of the invention, where the core 10 is in a plane parallel to the surface of the magnetic recording area 9, a step or leg portion 11 of core 10 may be provided to provide a surface for deposition of the single-turn electrically conductive gap material at 12 between leg portion 11 and ferrite block 13. This step or leg 11 also accommodates the windings 14 and 15, allowing a clearance between core 10 and surface 9. The gap 18 width is essentially equal to the depth of deposition of single-turn 12. The exact configuration of the conductive film in the read/write gap 12 between block 11 a nd leg 13 may take several forms, two of which are shown as 12 in FIG. 2 and as 33 in FIG. 1.

As shown in FIG. 2, windings 14 and 15 comprise discrete wires. As will be apparent to those skilled in the art said wires, 14 and 15 may be printed on the core 10 and leg 11 by silk screen, evaporation, electro plating, or deposition processes.

As shown in FIG. 2, the secondary winding 15 is attached at points 16 and 17 to single-turn 12, to complete the electrical path. The single conductive thin film 12 defines the length and, at its lower surface, the width of gap 18 and the width of the recorded track, and carries the transducing current, which flows between points 16 and 17. In this configuration, leg 11 and block 13 comprise the pole shoes, and single-turn 12 constitutes the spacer in gap 18. The transformer comprises core 10, primary winding 14, and secondary winding 15, 12.

The vertical dimension of pole piece 13 is greater than that of the thin conductive film 12, thereby forming a low-reluctance back gap. It is recognized, however, that this reluctance can be further reduced by filling or bridging the back gap in a suitable manner.

In operation, recording magnetic information on magnetic surface 9 which in FIG. 2 is essential parallel to the plane of core 10 and positioned beneath the gap 18, is as follows:

A recording current is passed through winding 14 in the direction of arrow 20, this impresses within core 10 a flux in direction of arrow 21. This flux induces in secondary winding 15 a current flowing in the direction of arrow 23 (which tends to oppose the flux 21). The current flowing in wire 15 flows between points 16 and 17 in the single-turn conductor 12. This current, flowing from contact 17 to contact 16, induces flux 24 across gap 18 and through the pole shoes 16, induces flux 24 across gap 18 and through the pole shoes 11 and 13.

As will be apparent to those skilled in the art, the read back is performed by sensing the flux across gap 18 which induces a current between point 16 and 17 of the single-turn area 12, which current flows through winding 15 inducing a flux in core 10, which in turn induces an output current in winding 14.

As is apparent from the figure, the flux 24 across gap 18 and the flux 21 in core 10 are perpendicular to each other for both recording and playback, thus eliminating stray flux at gap 18 from current through primary winding 14.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A single-turn head for recording on a magnetic medium, comprising:

write coil means for inducing first magnetic flux parallel to a first plane in a transformer core;

conductive gap means disposed between two pole shoes for inducing second magnetic flux within said pole shoes and across a write gap through said magnetic medium normal to said first plane;

secondary coil means for coupling said first magnetic flux to said conductive gap;

whereby the flux induced in said transformer core by current in said write coil means is at essentially a right angle to flux induced in said pole shoes by current in said conductive gap means such that said first magnetic flux does not interfere with said second magnetic flux in the region of said write gap.

2. The head of claim 1 wherein said first plane comprises the surface of said magnetic medium in the region of said conductive gap means.

3. A single-turn magnetic head, comprising:

single-turn means for selectively inducing or sensing a transducer flux parallel to a first plane across a read/write gap, read/write winding means for selectively sensing or inducing magnetic flux parallel to a second plane which is essentially perpendicular to said first plane within a transformer core, secondary winding means for coupling said read/write winding to said single-turn means, whereby said transformer core carries flux at essentially right angles to flux across said read/write gap thereby avoiding flux interference in the region of said gap.

4. The single-turn magnetic head of claim 3 characterized in that the magnetic flux within said transformer core is essentially parallel to the plane of the magnetic recording surface in the region of said gap.

5. A magnetic read/write head for recording and reproducing magnetic data in a magnetic medium, comprising:

transformer core means for carrying magnetic flux parallel to a first plane, a pair of pole shoes means for carrying magnetic flux parallel to a second plane which is essentially perpendicular to said first plane, conductor means disposed between said shoes means for carrying a transducing current through the gap between said pole shoes, said transducing current selectively being induced by second read flux or inducing second write flux across said gap, first coil means for sensing first read flux and inducing first write flux in said core means, second coil means including said conductor means for sensing first write flux and inducing second read flux in said core.

6. The head of claim 5 wherein the flux within said transformer core means is parallel to the surface of said magnetic medium.

7. A magnetic transducing apparatus for reading and writing magnetic information in a magnetizable medium, comprising:

transformer core means for providing a path for first magnetic flux, pole piece and core means for providing a path, perpendicular to said first magnetic flux path, for second magnetic flux, non-magnetic gap means within said pole piece and core means for forming a read/write gap in said second magnetic flux path, primary winding means for selectively inducing in the write mode or sensing in the read mode said first magnetic flux, secondary winding means including a single-turn portion through said read/write gap for selectively sensing said first magnetic flux and inducing said second magnetic flux in the write mode, or sensing said second magnetic flux and inducing said first magnetic flux in the read mode.

8. The transducing apparatus of claim 7 characterized by said transformer core means providing a path for said first magnetic flux parallel to a plane which is essentially parallel to the surface of said magnetizable medium in the region of said read/write gap.

9. The transducing apparatus of claim 7 characterized by said first and said second magnetic paths intersecting in a volume common to both said transformer core means and said pole piece and core means.

* * * * *